United States Patent [19]
Vishwakarma et al.

[11] Patent Number: 5,288,738
[45] Date of Patent: Feb. 22, 1994

[54] DYE COMPOUND AND PHOTOGRAPHIC ELEMENT CONTAINING SAME

[75] Inventors: Lal C. Vishwakarma, Rochester; Thomas R. Dobles, Hilton, both of N.Y.

[73] Assignee: Eastman Kodak Company, Rochester, N.Y.

[21] Appl. No.: 865,382

[22] Filed: Apr. 8, 1992

[51] Int. Cl.$^5$ ............... G03C 1/005; G03C 1/494
[52] U.S. Cl. ..................... 430/579; 430/578; 430/573; 430/577; 430/576; 430/583; 430/595; 430/570
[58] Field of Search ............ 430/578, 583, 573, 577, 430/576, 579, 595, 570

[56] References Cited

U.S. PATENT DOCUMENTS 2,448,858  9/1948  Carroll et al. ............. 430/572
3,976,493  8/1976  Borror et al. ............. 430/578

FOREIGN PATENT DOCUMENTS 1-91134  4/1989  Japan ..................... 430/570

Primary Examiner—Charles L. Bowers, Jr.
Assistant Examiner—J. Pasterczyk
Attorney, Agent, or Firm—Gordon M. Stewart

[57] ABSTRACT

A novel red-sensitizing dye compound has a structure which contains a pentamethine oxonol chromophore linked to one or two cyanine chromophores. A photographic element comprises a support upon which is coated a silver halide emulsion layer comprising cubic silver halide crystals and said red-sensitizing dye compound.

7 Claims, No Drawings

DYE COMPOUND AND PHOTOGRAPHIC ELEMENT CONTAINING SAME

FIELD OF THE INVENTION

This invention relates to novel dye compounds and to photographic elements containing them and more particularly, to such compounds and photographic elements wherein the dye compounds confer red sensitivity on silver halide emulsions.

BACKGROUND OF THE INVENTION

Silver halide has been widely used as a light sensitive component in photographic compositions and elements. Because silver halide is intrinsically sensitive only to blue light, it has often been desirable to impart to silver halide sensitivity to other wavelengths of radiation. This has generally been accomplished through the use of one or more spectral sensitizing dyes such as cyanine dyes. The dye is adsorbed to the silver halide surface and absorbs light or radiation of a certain wavelength. The energy thus absorbed by the dye is transferred to the silver halide to produce a latent image, from which a visible image can be developed during photographic processing. Sensitizing dyes are discussed in James, T. H., ed., *The Theory of the Photographic Process*, 4th Ed., Macmillan, N.Y., 1977, Chapter 8.

Cyanine dyes that contain a single methine group linking the two basic heterocyclic nuclei typically absorb blue light. The absorption of red light requires that the sensitizing dye contain an extended chromophore such as that of a dicarbocyanine structure, which is characterized by a link of three methine groups.

Oxonol dyes, which are highly susceptible to bleaching by sulfite in the course of photographic processing, have been employed as filter dyes (see, for example, Gaspar, U.S. Pat. No. 2,274,782). When employed for this purpose they are used in high enough concentration to produce an optical density greater than one in the region of predominant absorption. Carroll and Staud, U.S. Pat. No. 2,448,858, disclose that pentamethine oxonol dyes, which are only slightly adsorbed, if at all, on silver halide and act, at best, as weak red-sensitizing dyes, show moderately increased sensitizing action in the presence of basic cyanine dyes. They propose that these cyanine dyes, which in and of themselves confer no appreciable red sensitivity on silver halide emulsions, increase the sensitizing capability of the oxonol dyes. There is no suggestion in this patent of a single dye containing both cyanine and oxonol chromophores.

Ugai, Okazaki, and T. Sugimoto, Kokai Pat. No. SHO64 [1989]-91134, disclose compounds in which a spectral sensitizing dye that can be adsorbed on silver halide is connected by a covalent link to at least one virtually non-adsorbing dye containing at least two sulfo and/or carboxyl groups. These compounds are reported to sensitize both regular silver halide crystals such as cubic and octahedral and irregular crystals such as spherical and flat, and there is no suggestion of their exhibiting morphological selectivity.

The present invention provides photographic elements containing novel red-sensitizing dyes which contain simple cyanine moieties covalently linked to bleachable oxonol chromophores and which are morphologically selective for cubic silver halide crystals.

BRIEF SUMMARY OF THE INVENTION

The red-sensitizing dye compounds in accordance with the present invention are compounds having the general formula (I) or (II)

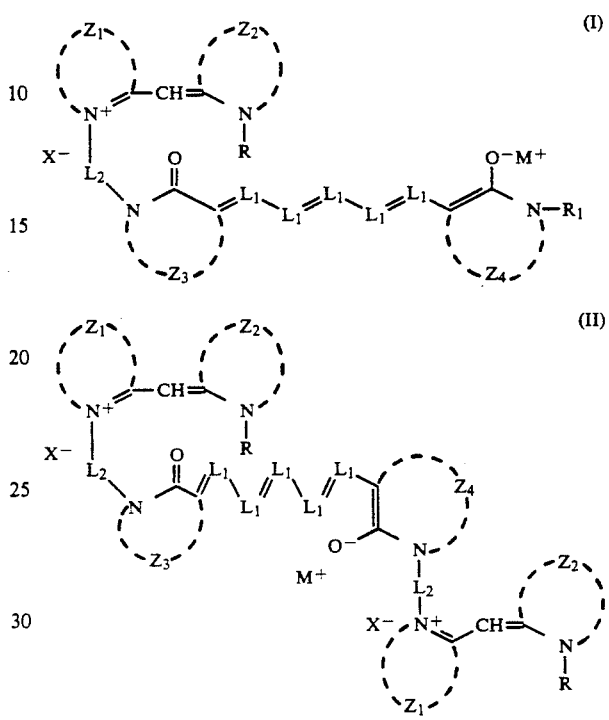

wherein $Z_1$, $Z_2$, $Z_3$ and $Z_4$ each independently represent the non-metallic atoms necessary to complete a substituted or unsubstituted heterocyclic ring system containing at least one 5- or 6- membered heterocyclic nucleus; R and $R_1$ each represent an alkyl group, sulfoalkyl group, carboxyalkyl group, sulfatoalkyl group, phosphonoalkyl group, or other substituted alkyl group of 1 to about 10 carbon atoms, or a substituted or unsubstituted aryl, aralkyl, or cycloalkyl group of 5 to about 12 carbon atoms; $L_1$ independently represents an unsubstituted or alkylsubstituted methine group; $L_2$ represents a linking group of 4 to about 20 atoms containing at least two alkylene groups and at least one ester group, amide group, or carbamate group; $M^+$ represents a cation; and $X^-$ represents an anion or an anionic group on the compound that forms an intramolecular salt.

Also in accordance with the present invention, a photographic element comprises a support upon which is coated a silver halide emulsion layer comprising cubic silver halide crystals and a dye of general formula (I) or (II).

DETAILED DESCRIPTION OF THE INVENTION

According to (I) and (II), which are the general formulas for the dyes of the invention, R and $R_1$ are independently alkyl from 1 to 10 carbon atoms, or aryl, aralkyl, or cycloalkyl groups of 5 to about 12 carbon atoms. Such groups can be substituted or unsubstituted. Examples of unsubstituted alkyl groups include methyl, ethyl, n-propyl, isopropyl, n-butyl, isobutyl, and the like. Cycloalkyl groups can be cyclopentyl, cyclohexyl, 4-methylcyclohexyl, and the like. Alkyl and cycloalkyl groups can be substituted with substituents such as sulfo, carboxyl, sulfato, phosphono, halogen, alkoxy, aryl, and the like. Examples of aryl groups useful as R and $R_1$ include phenyl, naphthyl, and the like. Aralkyl groups can be benzyl, phenethyl, and the like. Aryl and aralkyl groups can be substituted with substituents such as sulfo, carboxyl, sulfato, phosphono, halogen, alkoxy, alkyl, and the like. In a preferred embodiment, R and $R_1$ are each independently sulfoalkyl, sulfatoalkyl, phosphonoalkyl or carboxyalkyl of up to about 8 carbon atoms. In a more preferred embodiment, R is sulfoalkyl of 1 to about 8 carbon atoms, and $R_1$ is carboxyalkyl of 2 to about 8 carbon atoms.

$Z_1$ and $Z_2$ each represent the atoms necessary to complete a substituted or unsubstituted 5- or 6-membered aromatic heterocyclic ring. The ring can be substituted with known substituents, such as alkyl, alkoxy, halogen, and the like, or it may have substituents that join together to form a fused ring system. Examples of heterocyclic rings for $Z_1$ and $Z_2$ include a thiazole nucleus (e.g., thiazole, 4-methylthiazole), a benzothiazole nucleus (e.g., benzothiazole, 5-methoxybenzothiazole), a naphthothiazole (e.g., naphtho[2,1-d]thiazole, 5-methoxynaphtho[2,3-d]thiazole), a thiazoline nucleus (e.g., thiazoline, 4-nitrothiazoline), an oxazole nucleus (e.g., oxazole, 4-phenyloxazole), a benzoxazole nucleus (e.g., benzoxazole, 5-trifluoromethylbenzoxazole), a naphthoxazole nucleus (e.g., naphtho[3,1-d]oxazole, naphtho[2,3-d]oxazole), an isoxazole nucleus (e.g., 5-methylisoxazole), an oxazoline nucleus (e.g., 4,4-dimethyloxazoline), a selenazole nucleus (e.g., 4-methylselenazole), a benzoselenazole nucleus (e.g., benzoselenazole, 5-methoxybenzoselenazole), a naphthoselenazole nucleus (e.g., naphtho[2,1-d]selenazole), a 3,3-dialkylindolenine nucleus (e.g., 3,3-dimethylinodolenine, 3,3-dimethyl-5-methoxyindolenine), an imidazole nucleus (e.g., 1-alkylimidazole, 1-alkyl-5-methoxybenzimidazole, 1-aryl-5,6-dichlorobenzimidazole), a pyridine nucleus (e.g., 2-pyridine, 3-methyl-4-pyridine), a quinoline nucleus (e.g., 2-quinoline, 3-methyl-2-quinoline, 8-fluoro-2-quinoline), an imidazo[4,5-b]quinoxaline nucleus (e.g., 1,3-diethylimidazo]4,5-b]quinoxaline), an oxadiazole nucleus, a thiadiazole nucleus, a tetrazole nucleus, a pyrimidine nucleus, and the like. In a preferred embodiment of the invention $Z_1$ and $Z_2$ are the same. In another preferred embodiment $Z_1$ and $Z_2$ represent the atoms necessary to complete a substituted or unsubstituted thiazoline, thiazole, benzothiazole, or a benzoxazole nucleus.

$Z_3$ and $Z_4$ each represent the atoms necessary to complete a substituted or unsubstituted 5- or 6-membered non-aromatic ring. In a preferred embodiment of the invention $Z_3$ and $Z_4$ represent the atoms necessary to complete a barbituric acid or a 5-pyrazolone nucleus. In another preferred embodiment $Z_3$ and $Z_4$ are the same.

$L_1$ independently represents a substituted or unsubstituted methine group. Examples of substituents for methine groups include alkyl (e.g., of from 1 to 6 carbon atoms), aryl (e.g., phenyl), aralkyl (e.g., benzyl), alkoxy (e.g., methoxy, ethoxy). Also, substituents from the methine chain can form a 4- to 6-membered ring with each other. In a preferred embodiment, the methine groups are unsubstituted.

X is an anion or an anionic group on the compound of formula (I) to form an intramolecular salt. Examples of X amions include p-toluenesulfonate, halogen (e.g., bromide, iodide, chloride), ethyl sulfate, and perchlorate. Examples of anionic groups that can be part of the compound include sulfo, sulfato, and carboxyl.

The dyes of the present invention are prepared by the procedure described in the commonly assigned, co-pending application of Vishwakarma et al., Ser. No. 07/865165, entitled "Process for the Preparation of Binary Sensitizing Dyes," filed concurrently herewith and incorporated herein by reference. More particularly, they are obtained by the reaction of two dye compounds which contain substituents that enable them to undergo a dehydrative condensation reaction. Thus, a dye compound having a carboxyl or carboxyl salt substituent is reacted with a second dye compound having a hydroxyalkyl or an amino substituent. In accordance with the procedure described in the above-identified application and illustrated in the examples hereinafter, the reaction is carried out in an aprotic solvent such as dimethylsulfoxide at room temperature in the presence of at least a molar equivalent of a 2-halo-1-alkylpyridinium salt and a catalytic amount of a 4-dialkylaminopyridine.

Specific examples of dyes of the general formula (I) according to the invention are shown below.

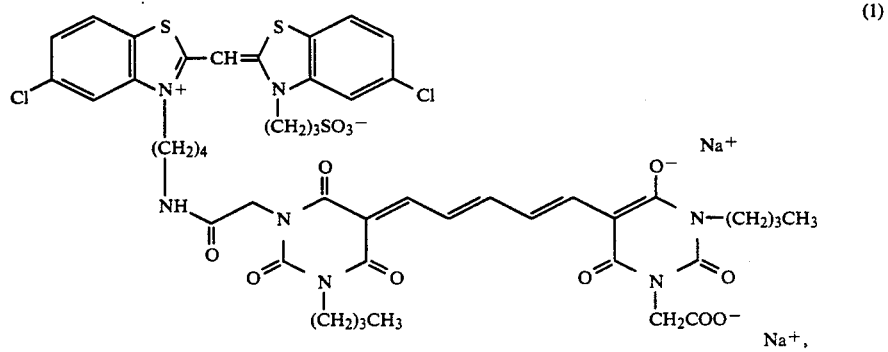

(I)

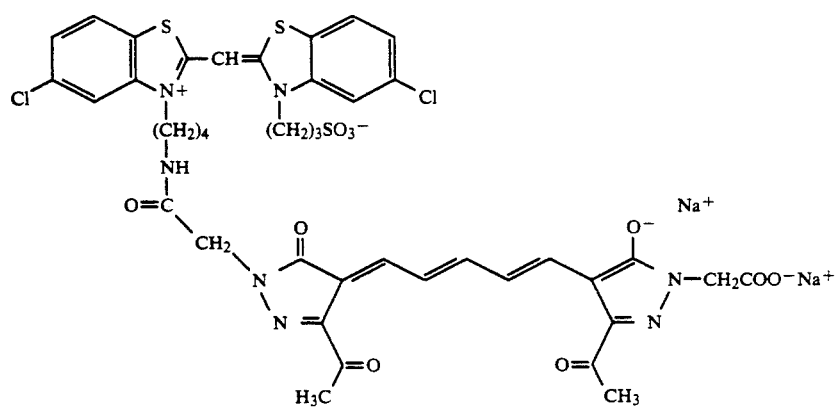
(2)
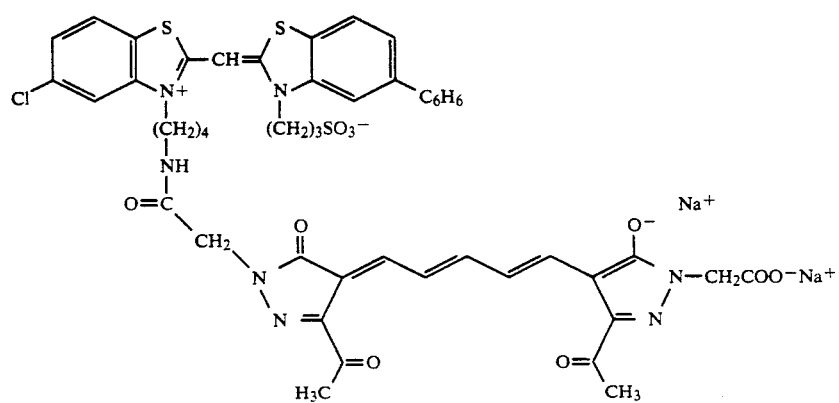
(3)
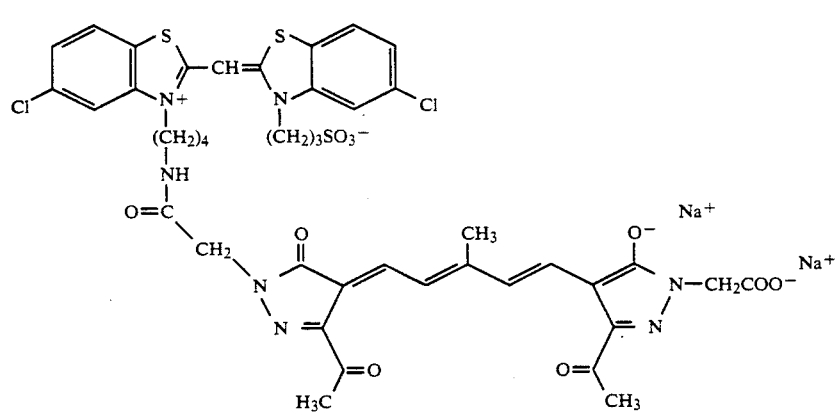
(4)
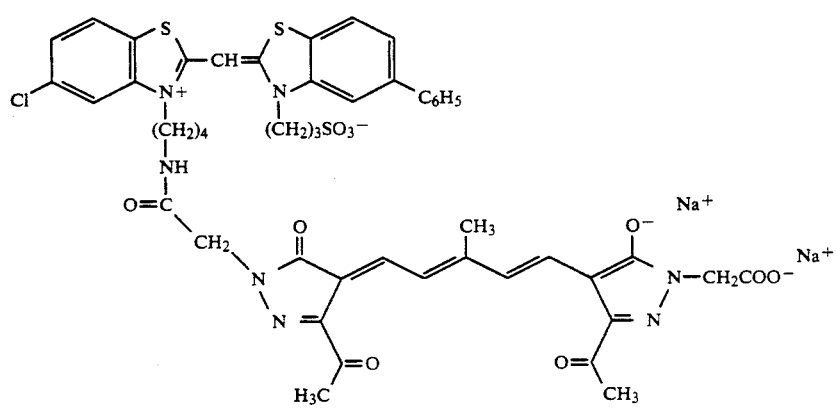
(5)

(6)
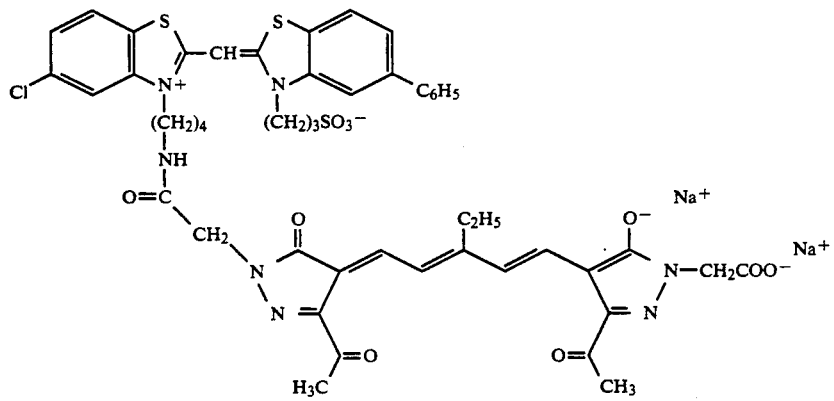
(7)
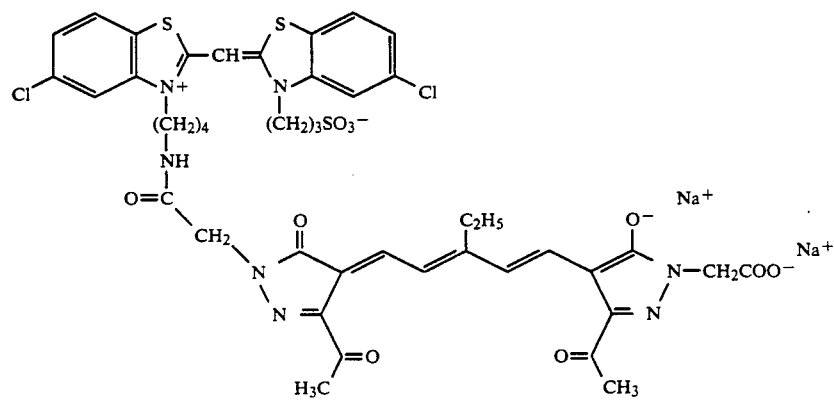
(8)
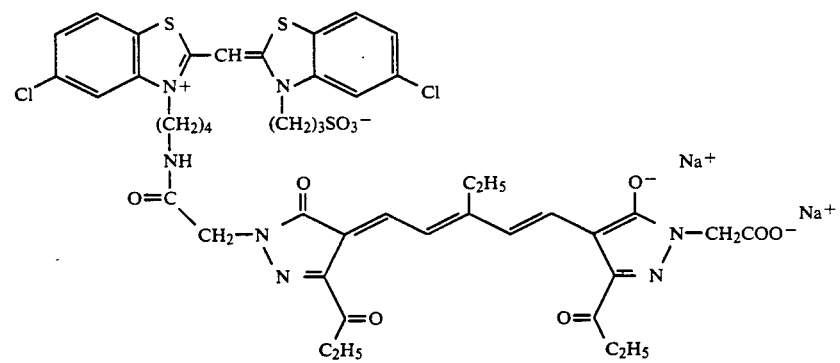
(9)
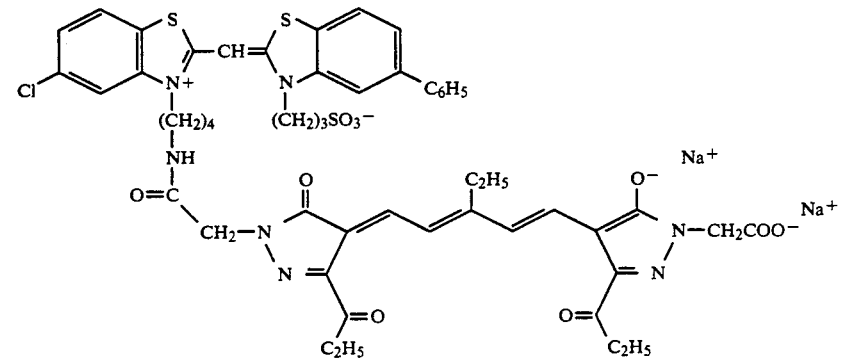

-continued
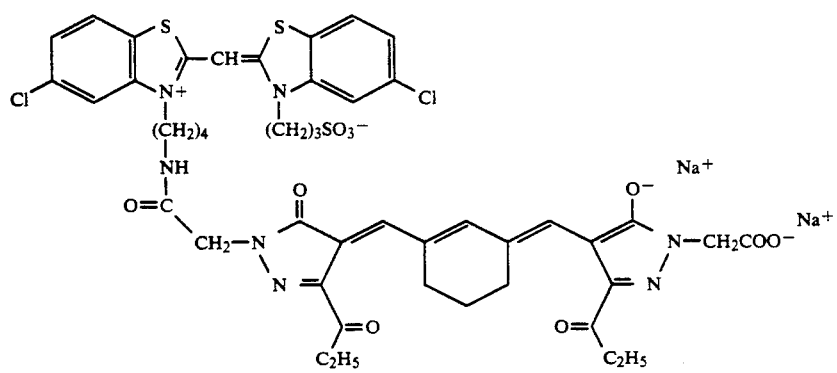
(10)
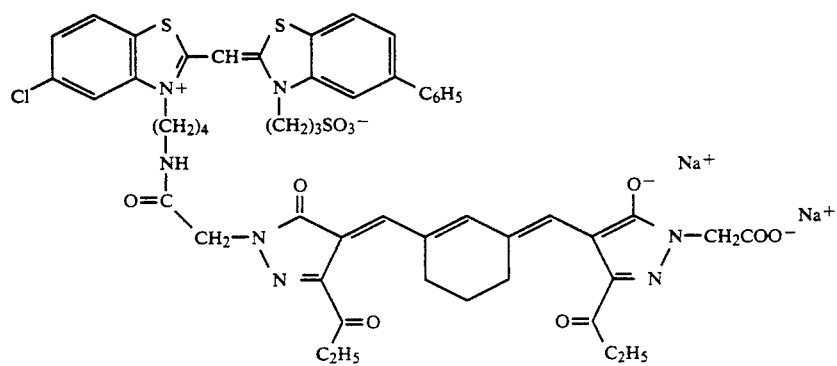
(11)
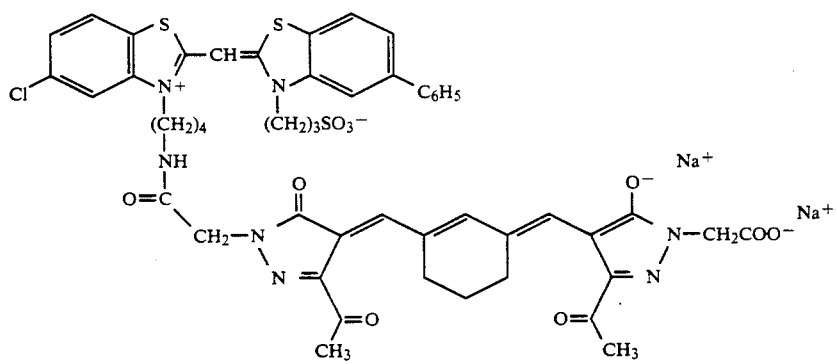
(12)
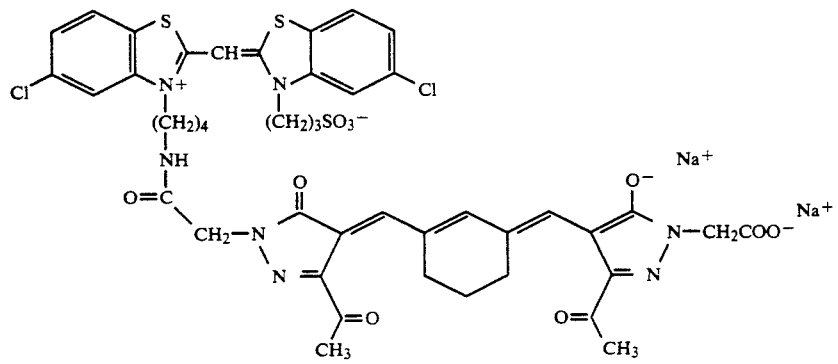
(13)

-continued
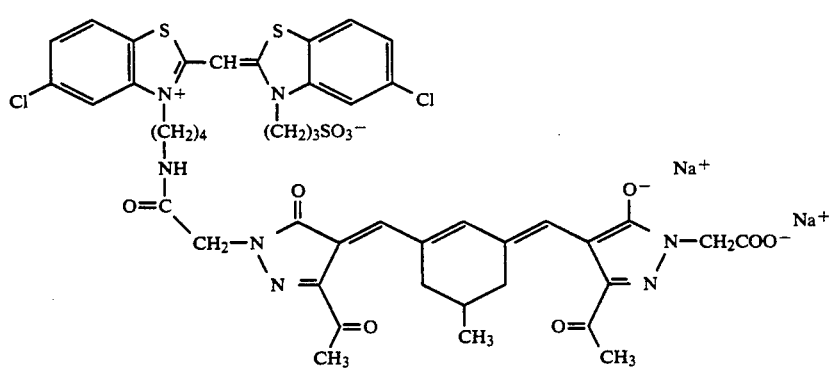
(14)
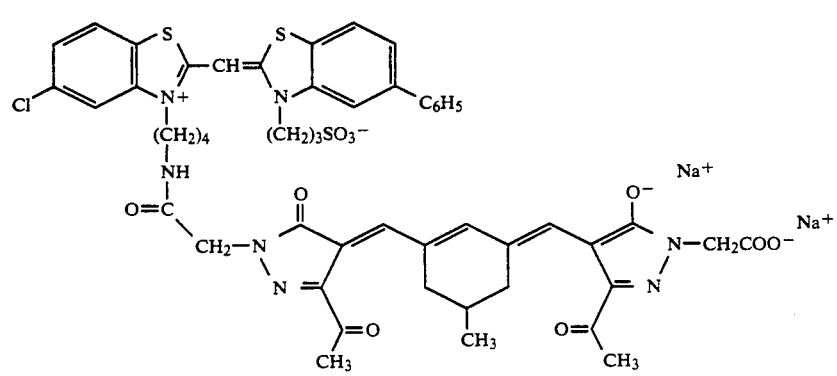
(15)
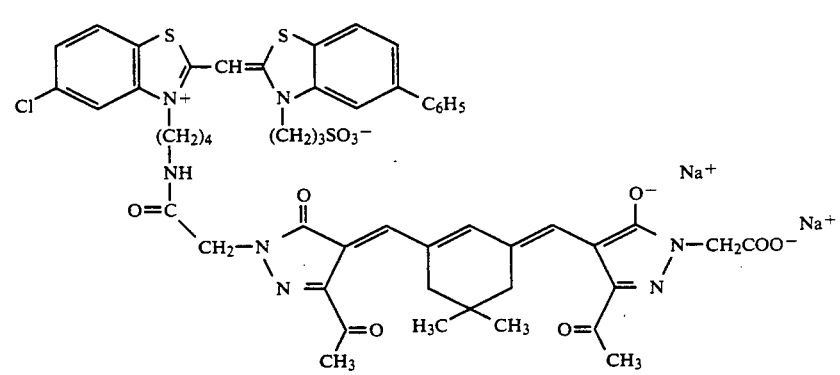
(16)
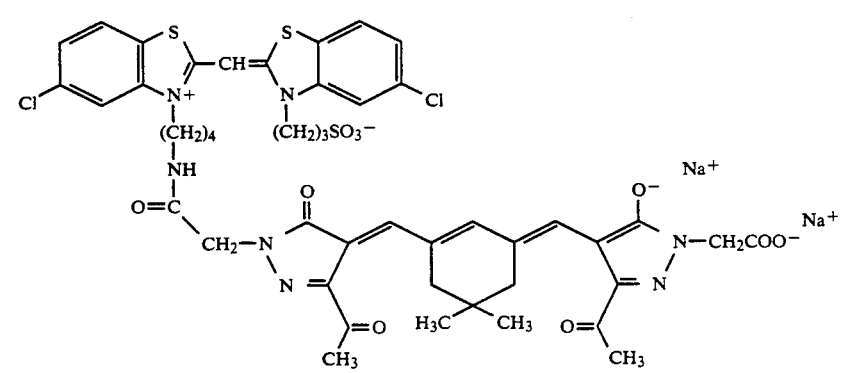
(17)

-continued
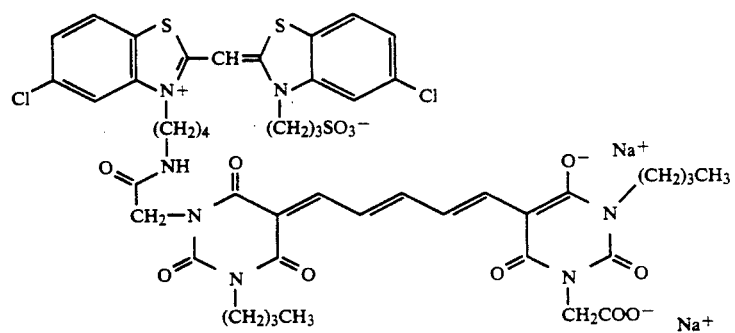
(18)
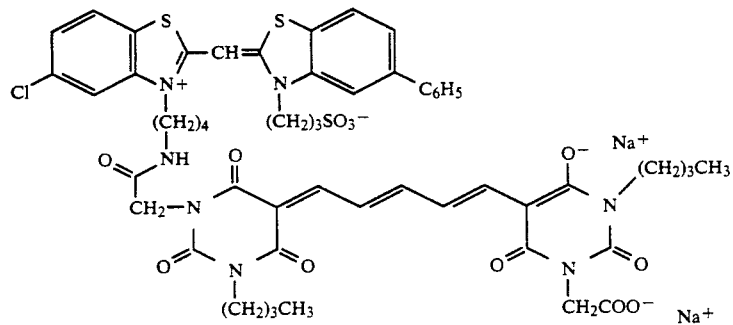
(19)
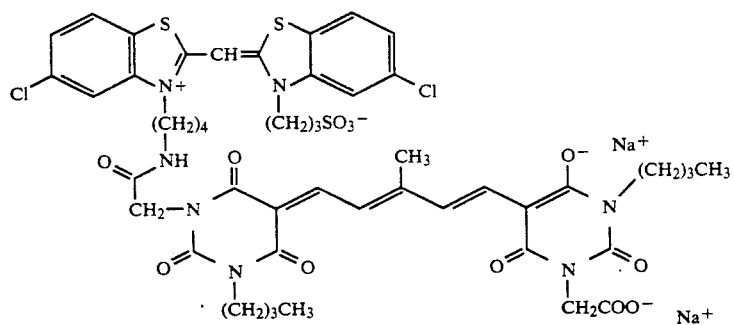
(20)
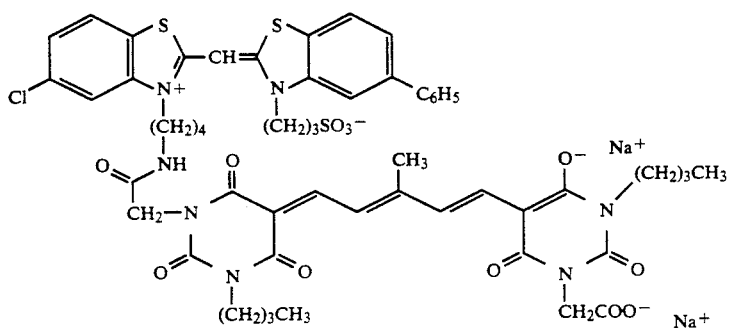
(21)

-continued
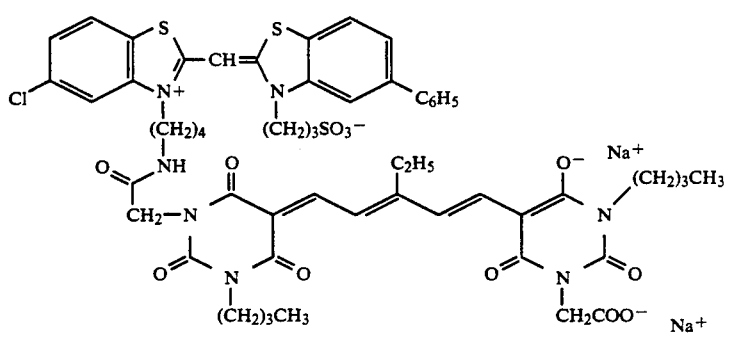
(22)
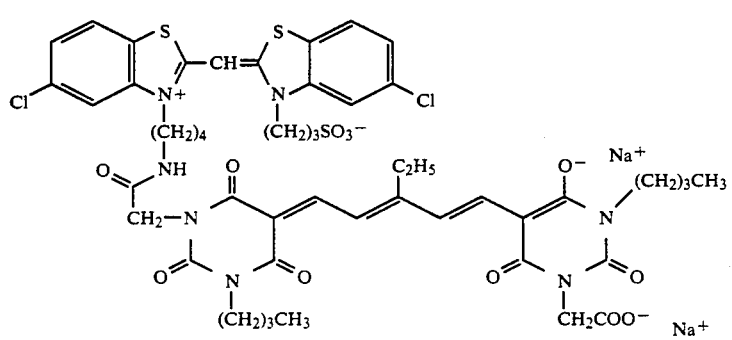
(23)
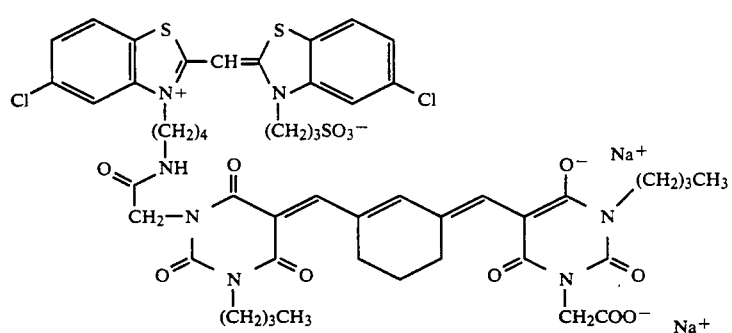
(24)
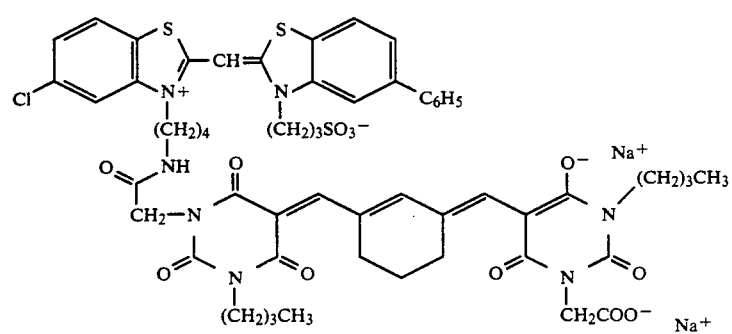
(25)

-continued
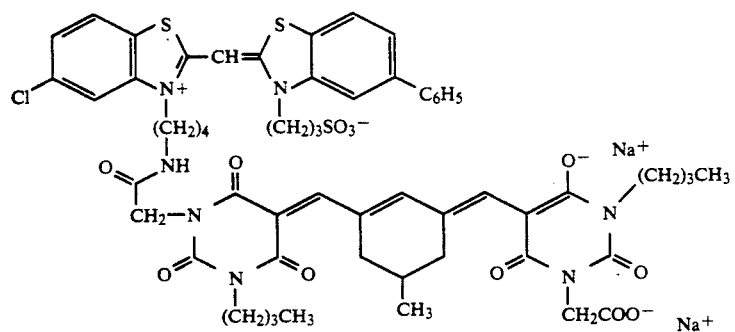
(26)
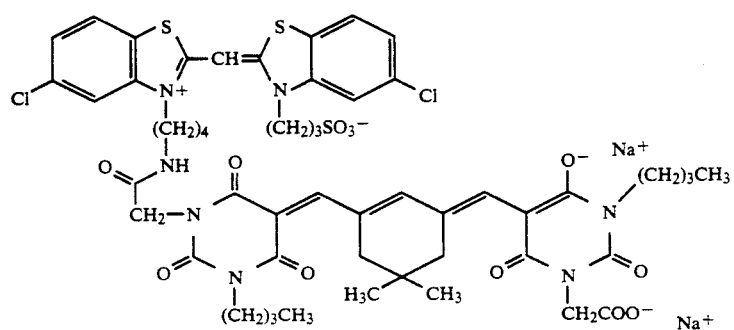
(27)
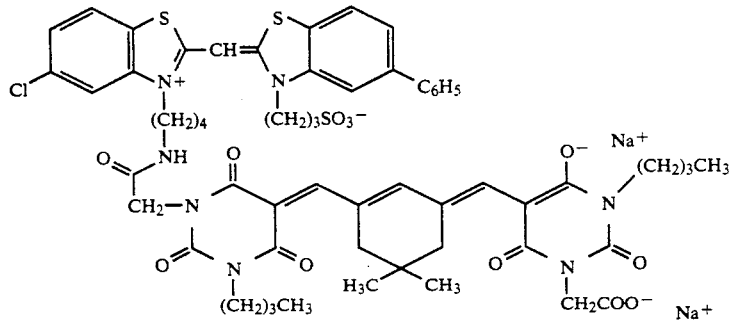
(28)
Specific examples of dyes of the general formula (II) according to the invention are shown below.
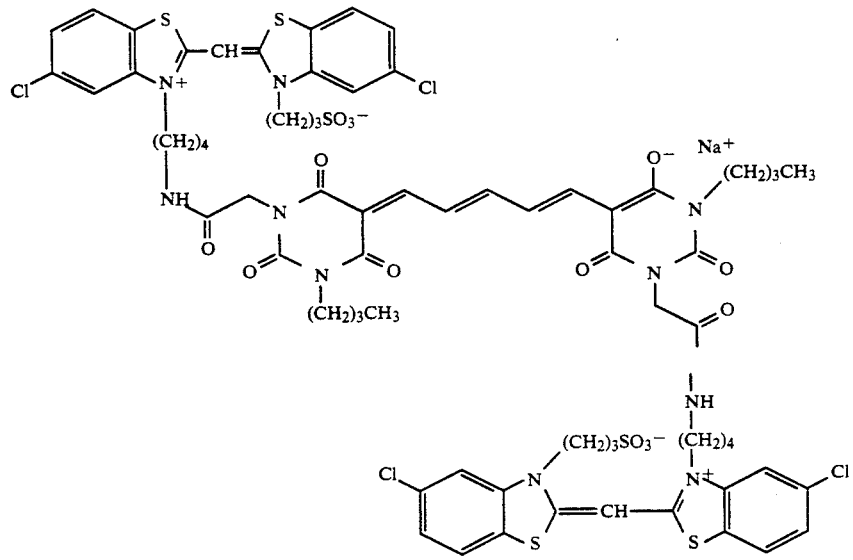
(29)

-continued
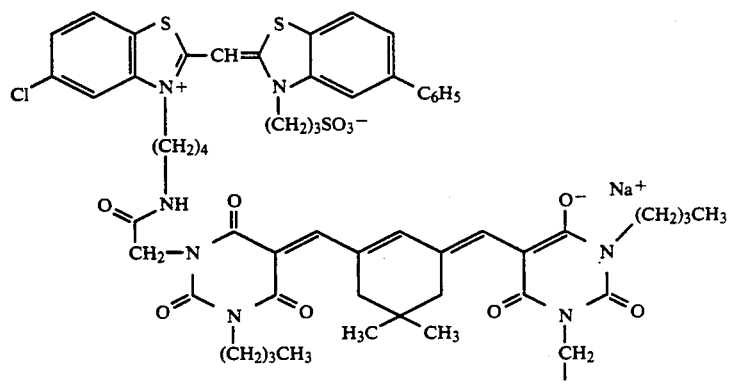
(30)
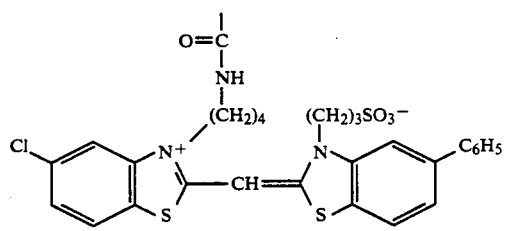
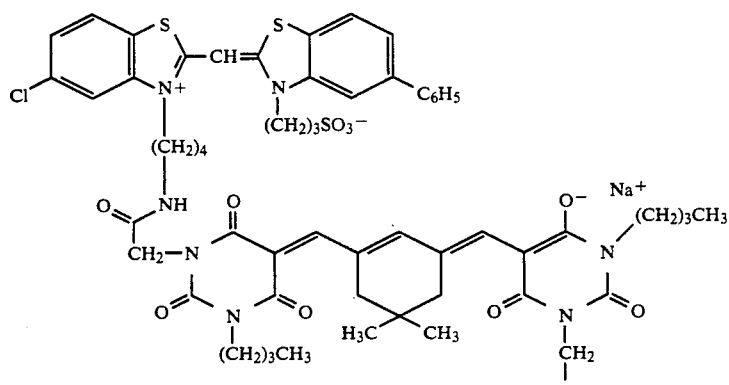
(31)
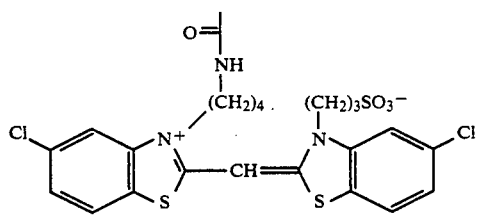
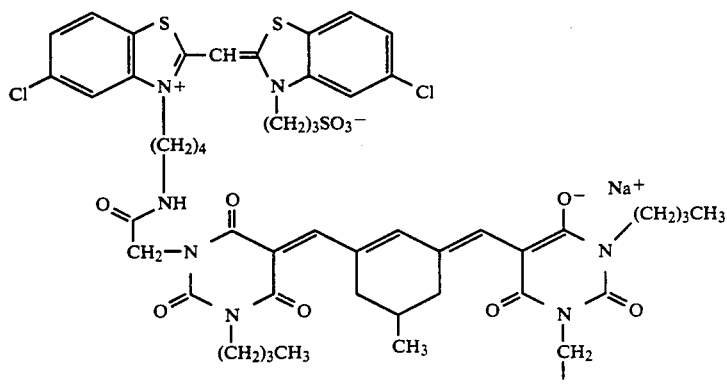
(32)

-continued
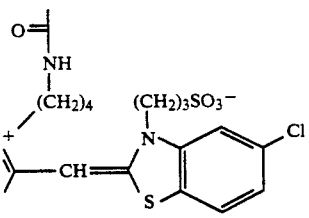
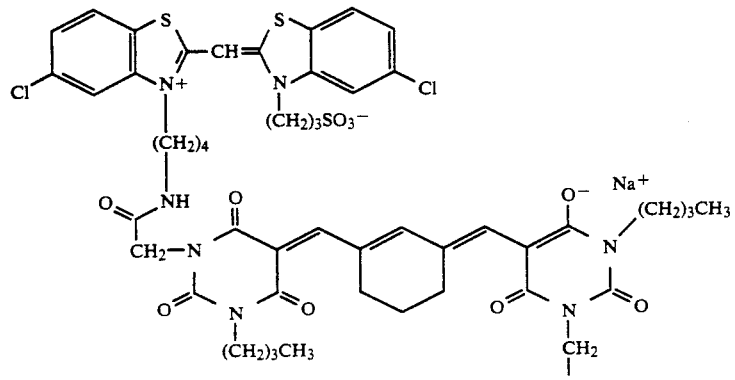
(33)
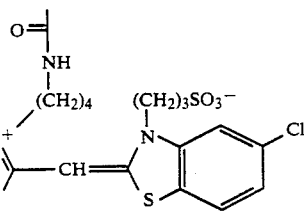
(34)
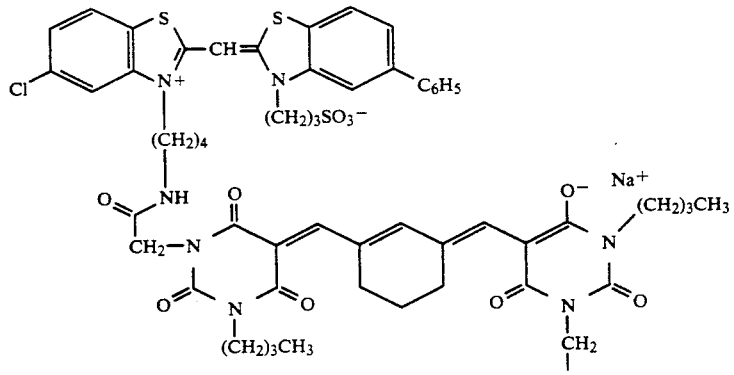
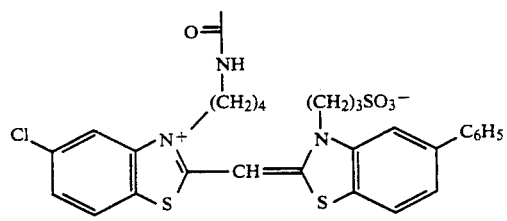

-continued
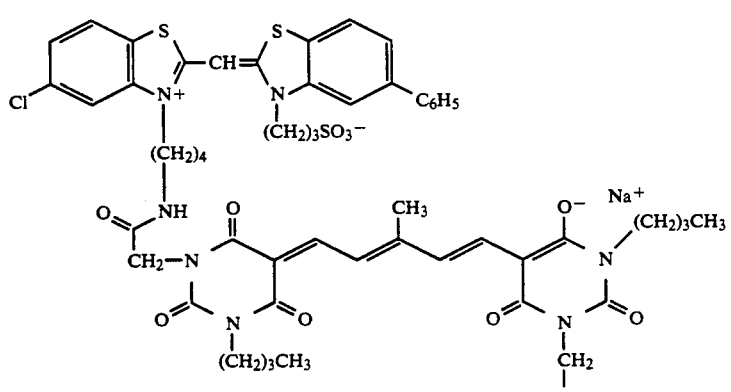
(35)
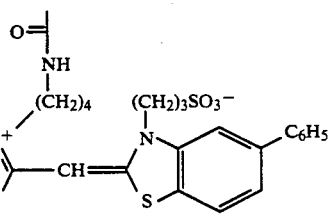
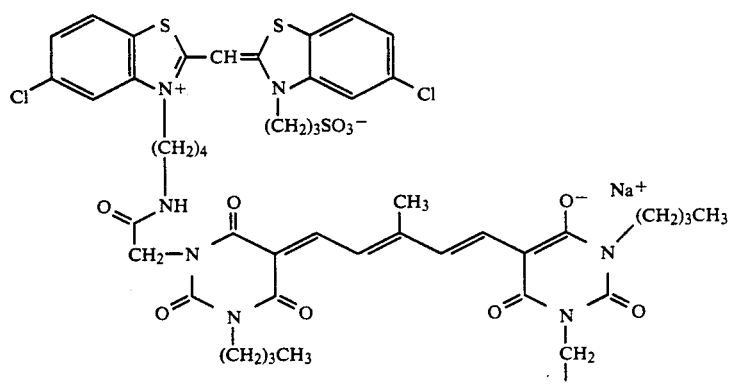
(36)
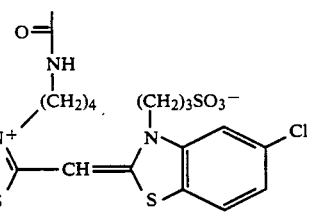
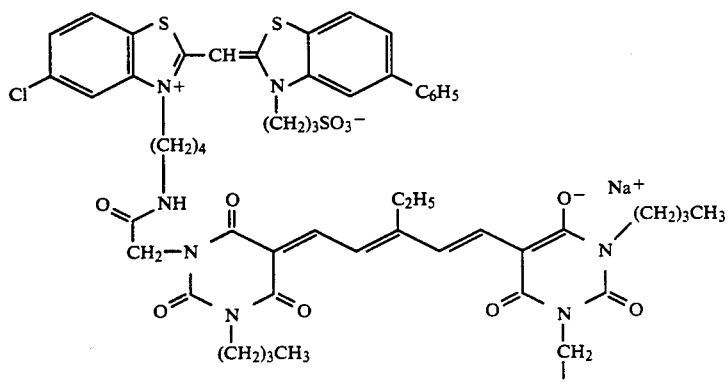
(37)

-continued
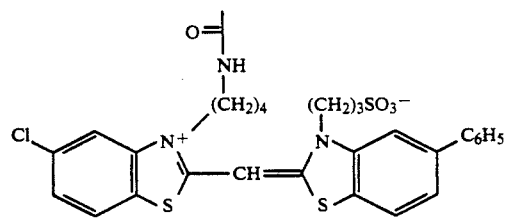
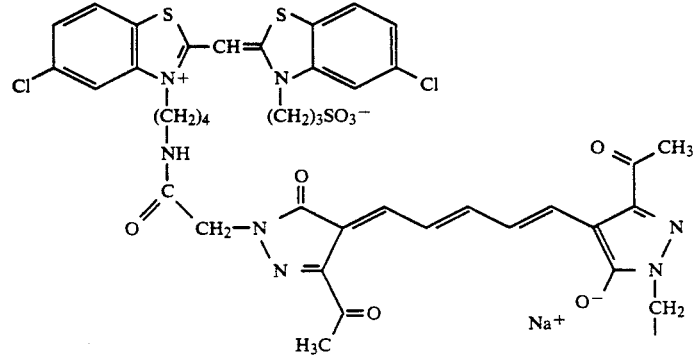
(38)
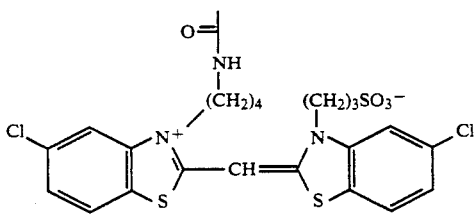
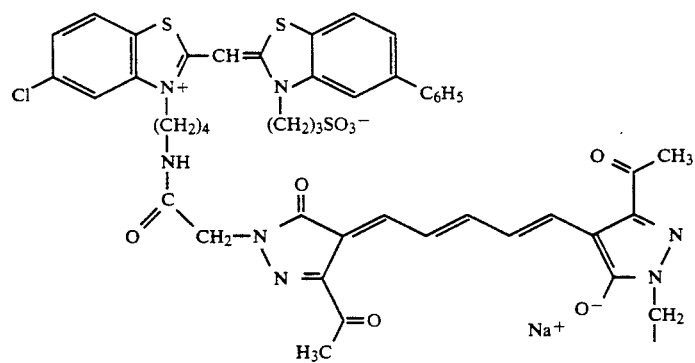
(39)
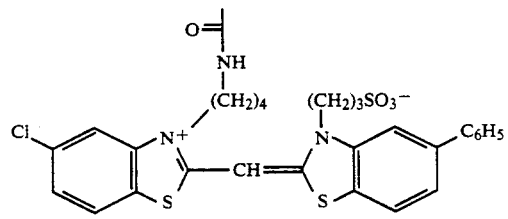

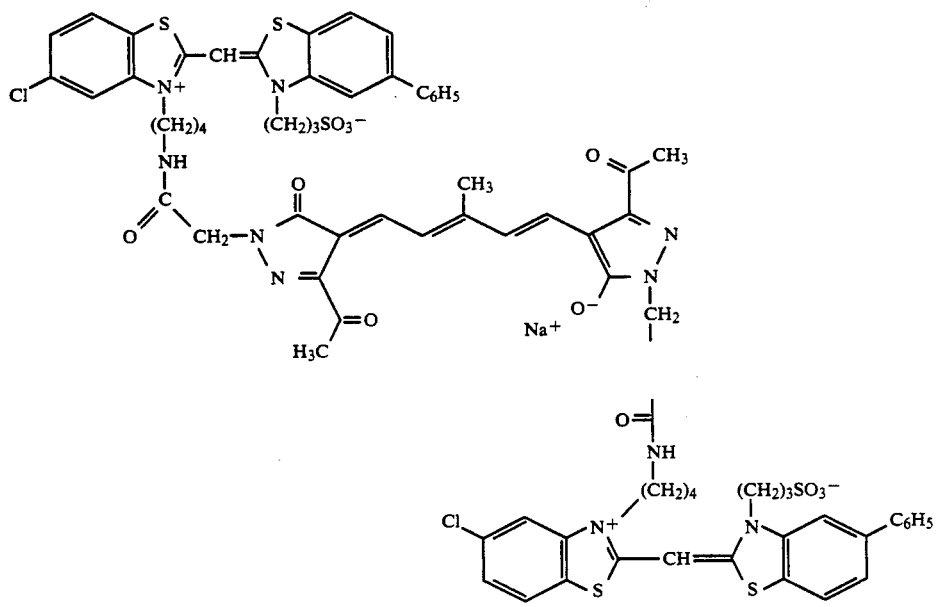
(40)
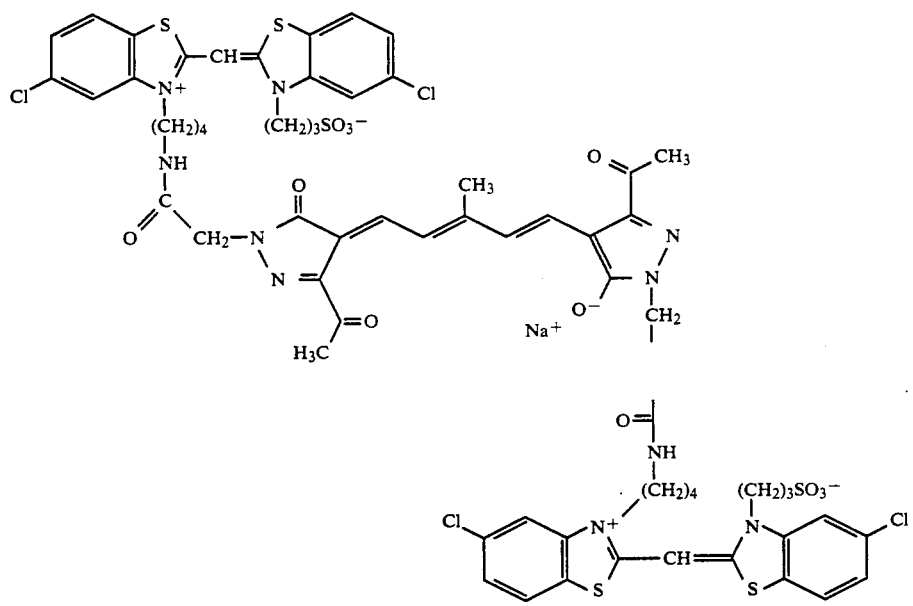
(41)
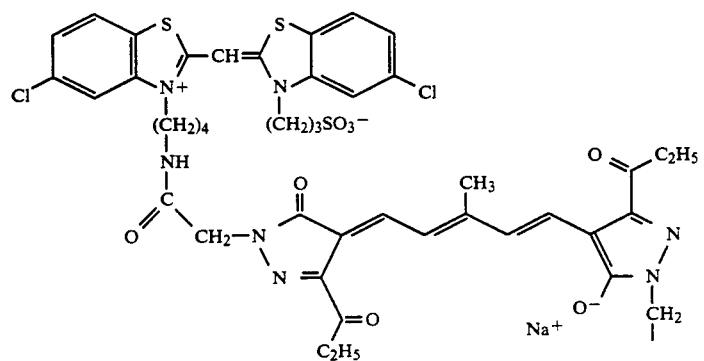
(42)

-continued
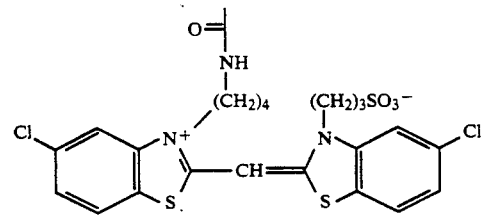
(43)
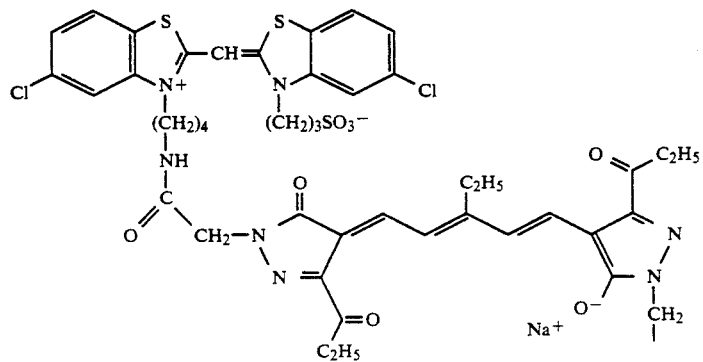
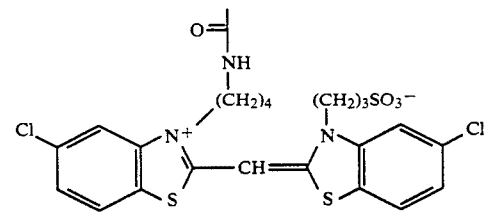
(44)
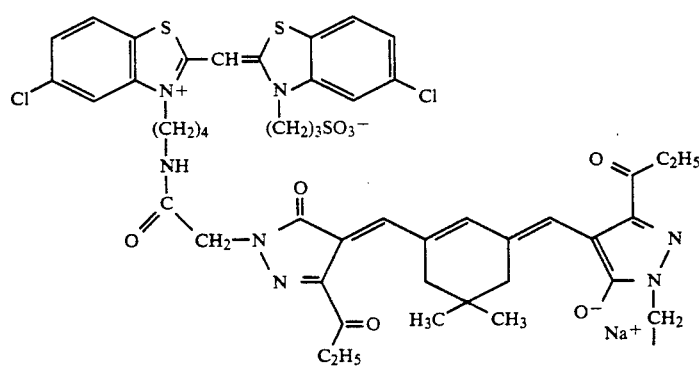
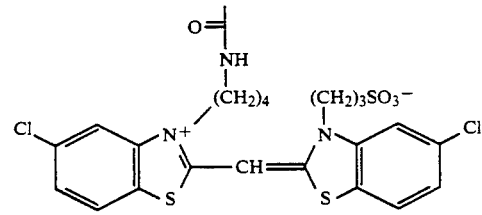

-continued
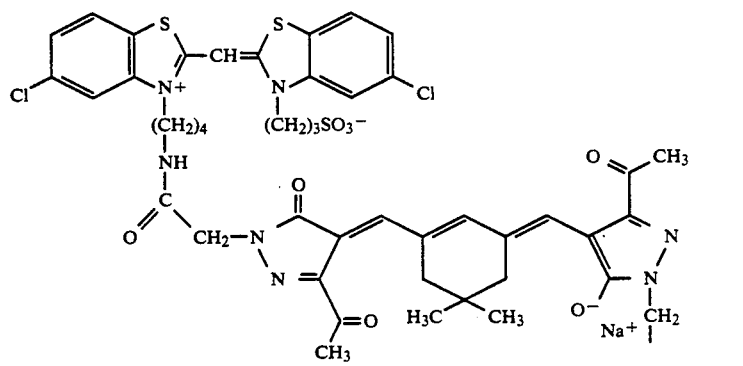
(45)
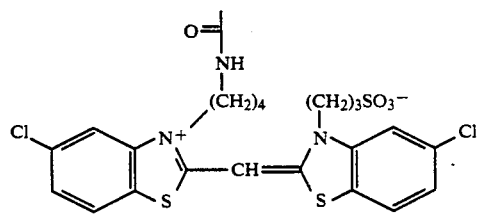
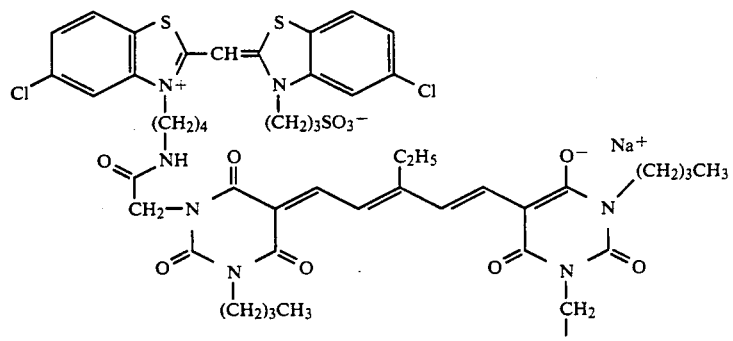
(46)
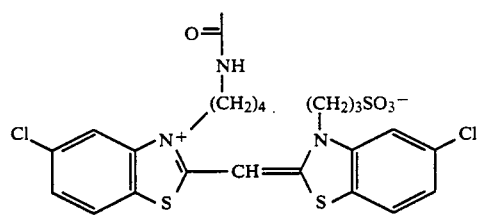
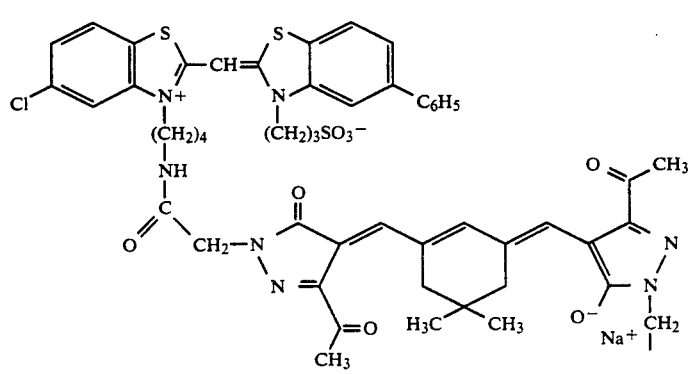
(47)

-continued
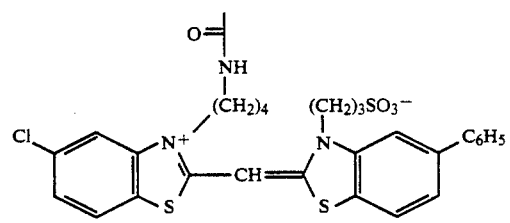
(48)
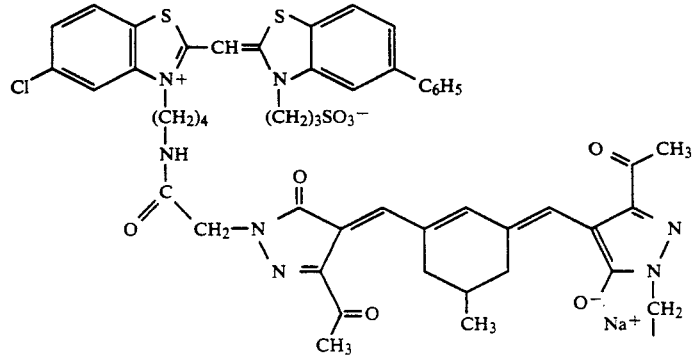
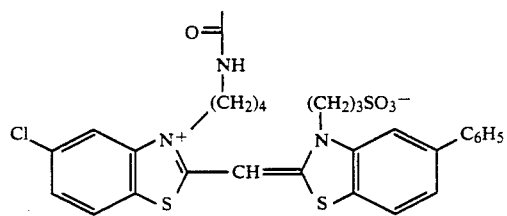
(49)
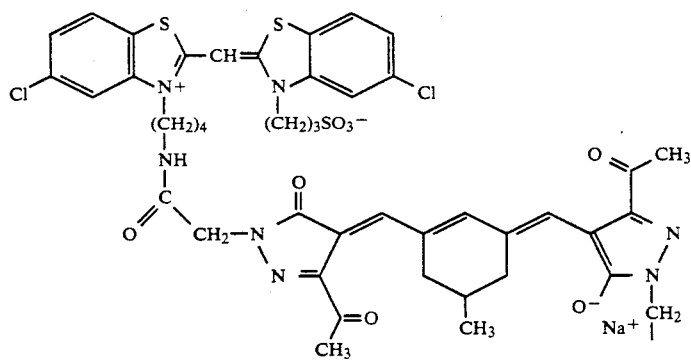
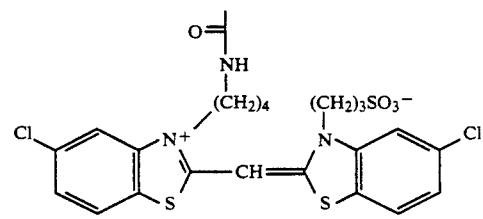

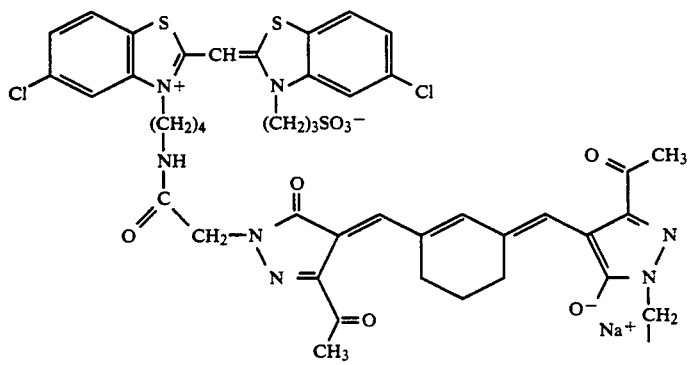
(50)
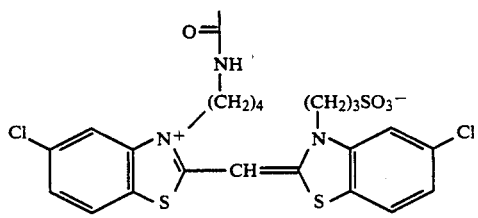
(51)
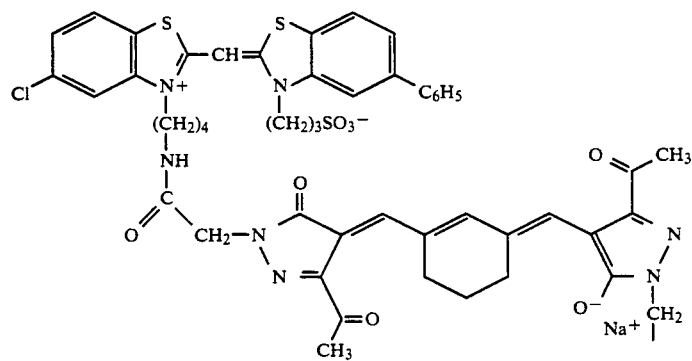
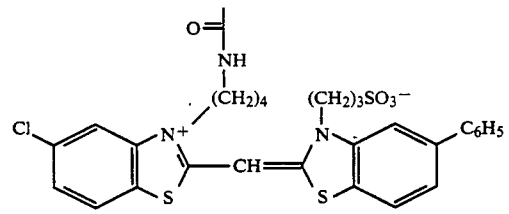
(52)
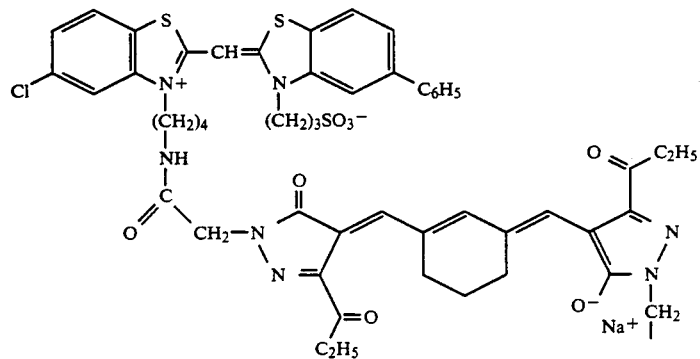

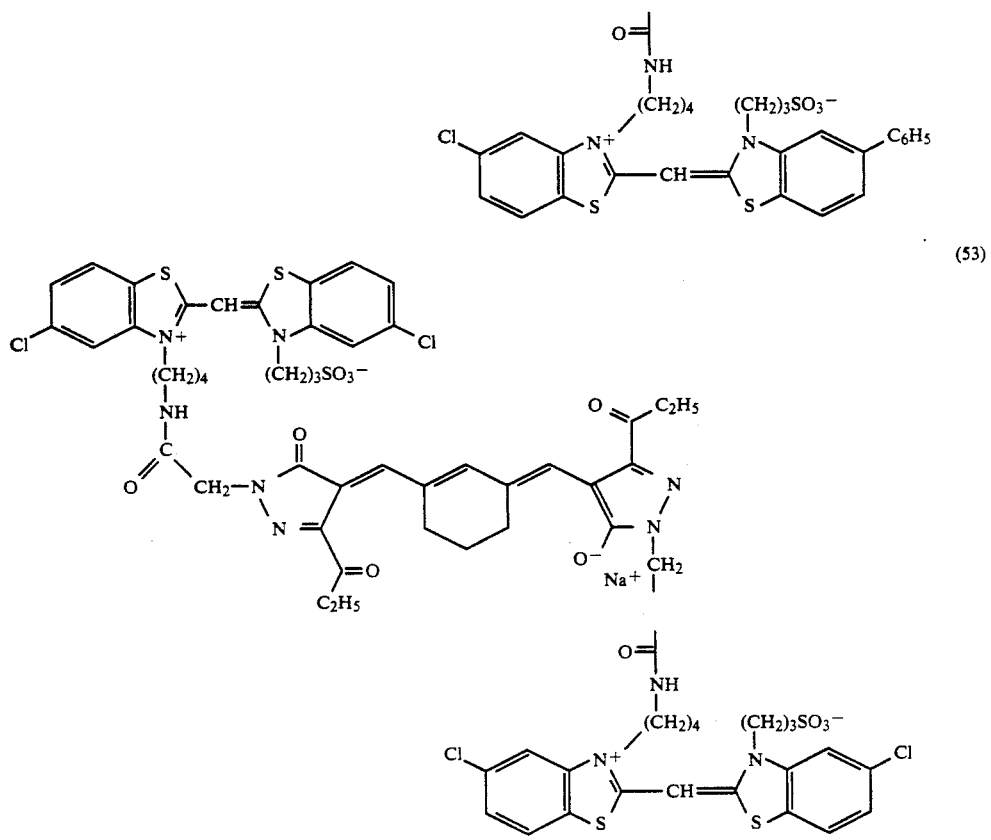

(53)

In contrast to the novel dyes of the present invention, dyes which separately contain the oxonol and cyanine chromophores that are covalently linked in the dyes of the present invention do not, whether used separately or in equimolar mixture, impart measurable red sensitivity to a silver halide photographic emulsion. Furthermore, dyes containing cyanine chromophores like those which are part of the molecular structure of the dyes of the present invention typically confer additional sensitivity to blue light on a silver halide emulsion. However, the dyes of the present invention increase only the red sensitivity, not the blue sensitivity of a photographic emulsion.

The novel dyes of the present invention impart red sensitivity to a silver halide emulsion that is remarkably selective for cubic silver halide crystals. They do not confer red sensitivity on octahedral silver halide crystals. (For a description of the different crystal forms of photographic silver halides, see J. Maskasky, *J. Imaging Science,* 1986, 30(6), pp. 247–254).

Because in many cases the rates of growth of cubic and octahedral surfaces are nearly alike, the formation of cubic silver halide crystals in a photographic emulsion is generally accompanied by substantial octahedral surface contamination (Berry, C. R. in James, T. H., ed., *The Theory of the Photographic Process,* 4th Ed., Macmillan, N.Y., 1977, p. 99). The novel sensitizing dyes of the invention enable the selective sensitization of cubic silver halide crystals, or grains, in emulsions containing octahedral grains. This capability of the dyes of the invention for differentiating crystal morphology can also provide a means for analyzing cubic silver halide emulsions, using the extent of dye adsorption to measure the amount of cubic grains that are present.

The use of conventional red-sensitizing dyes of the dicarbocyanine and tricarbocyanine type generally results in a measurable amount of post-process stain. Photographic elements containing dyes of the present invention, whose molecular structures include pentamethine oxonol chromophores, which are known to be readily bleachable under conditions of photographic processing, exhibit acceptable levels of post-process stain.

The silver halide in the photographic element of the invention can be advantageously subjected to chemical sensitization with compounds such as gold sensitizers (e.g., aurous sulfide) and others known in the art. Compounds and techniques useful for chemical sensitization of silver halide are known in the art and described in Section III of *Research Disclosure,* December 1989; item 308119 (hereinafter referred to as *Research Disclosure I*), and the references cited therein.

The amount of sensitizing dye in the emulsion can be any amount that is known in the art to be useful for spectral sensitization of silver halide. The quantity of dye employed will vary with the specific dye or dye combination chosen as well as the size and aspect ratio of the grains. It is known in the photographic art that optimum spectral sensitization is obtained with organic dyes at about 25 to 100 percent or more of monolayer coverage of the total available surface area of surface sensitive silver halide grains, as disclosed for example, in West et al., "The Adsorption of Sensitizing Dyes in Photographic Emulsions," *Journal of Phys. Chem.,* Vol. 56, p. 1065, 1952 and Gilman et al., U.S. Pat. No.

3,979,213. Optimum dye concentration levels can be determined as taught by James, T. H., ed., *The Theory of the Photographic Process*, 4th Ed., Macmillan, N.Y., 1977, Chapter 9.

Photographic emulsions contain one or more vehicles for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin), phthalated gelatin, and the like), and others as described in Section IX of *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinylpyridine, methacrylamide copolymers, and the like, as described in *Research Disclosure I*. The vehicle can be present in the emulsion in any amount known to be useful in photographic emulsions.

Other addenda include antifoggants, stabilizers, filter dyes, light absorbing or reflecting pigments, vehicle hardeners such as gelatin hardeners, coating aids, dye-forming couplers, and development modifiers such as development inhibitor releasing couplers, timed development inhibitor releasing couplers, and bleach accelerators. These addenda and methods of their inclusion in emulsion and other photographic layers are well-known in the art and are disclosed in *Research Disclosure I* and the references cited therein.

The emulsion can also include optical brighteners, such as stilbene brighteners. Such brighteners are well-known in the art, as described in Section V of *Research Disclosure I*.

The emulsion layer containing silver halide sensitized with the dye of formula (I) can be coated simultaneously or sequentially with other emulsion layers, subbing layers, filter dye layers, interlayers, or overcoat layers, all of which may contain various addenda known to be included in photographic elements. These include antifoggants, oxidized developer scavengers, development inhibitor-releasing (DIR) couplers, antistatic agents, optical brighteners, light-absorbing or light-scattering pigments, and the like.

The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element can be chill-set or dried, or both. Drying can be accelerated by known techniques such as conduction, convection, radiation heating, or a combination thereof.

Photographic elements comprising the composition of the invention can be black and white or color. A color photographic element generally contains three silver emulsion layers or sets of layers: a blue-sensitive layer having a yellow color coupler associated therewith, a green-sensitive layer having a magenta color coupler associated therewith, and a red-sensitive layer having a cyan color coupler associated therewith. The photographic element of the invention is advantageously utilized in a red-sensitive layer of a color photographic element. These color image-forming couplers along with other element configurations are well-known in the art and are disclosed, for example, in Section VII of *Research Disclosure I*.

Photographic elements comprising the composition of the invention can be processed in any of a number of well-known photographic processes utilizing any of a number of well-known processing compositions, described, for example, in Section XIX of *Research Disclosure I*.

The invention is further illustrated in the following examples.

Structures of compounds referred to in the examples are as follows:

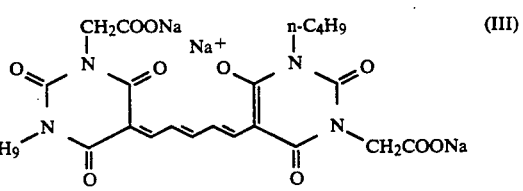

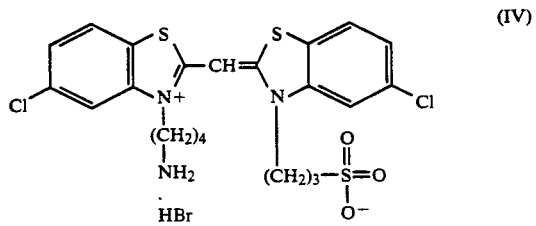

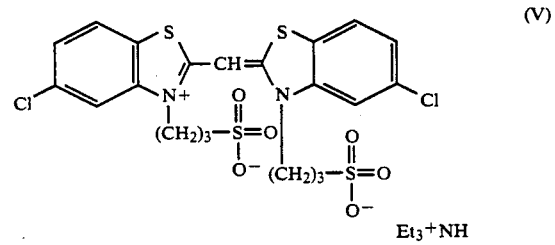

EXAMPLE 1

Synthesis of Sensitizing Dye (1)

A mixture of 1.556 g (0.0025 mole) of the hydrobromide salt of the alkylaminosubstituted cyanine dye (IV), 1.45 g (0.0025 mole) of the pentamethine oxonol dye (III), 0.092 g (0.00075 mole) of 4-dimethylaminopyridine, 0.74 g (0.0050 mole) of 3,4-dihydro-2H-pyrido [1,2a] pyrimidin-2-one, and 100 mL of reagent grade dimethylsulfoxide was magnetically stirred under an argon atmosphere at room temperature. After 10 minutes 0.70 g (0.00255 mole) of 2-chloro-1-methylpyridinium iodide was added all at once. After 5 minutes 0.46 g (0.60 mL, 0.0025 mole) of tri-n-butylamine was added. The reaction mixture, after stirring for another 10 minutes, was poured into 1 liter of acetone. The precipitate was collected by filtration on a sintered glass funnel, washed with two 100 mL portions of acetone and one 100 mL portion of ether, and air dried. 1.7 g of crude product was obtained. Purification by flash column chromatography using 4:1 dichloromethane:methanol yielded 1.2 g of the desired dye (1). Infrared and $^1$H NMR spectra were consistent with the proposed structure. The dye had $\lambda_{max}$ at 429 nm ($\epsilon_{max}$ 6.49×10$^4$) and 596 nm ($\epsilon_{max}$ 10.17×10$^4$), and fluoresced at 625 nm. Elemental analysis: Calcd for $C_{47}H_{49}Cl_2N_7O_{12}S_3Na_2$.-

$H_2O$: C, 49.74; H, 4.53; N, 8.63; Cl, 6.25; S, 8.48. Found: C, 49.65; H, 4.61; N, 8.99; Cl, 6.63; S, 7.27.

EXAMPLE 2

Synthesis of Sensitizing Dye (29)

The procedure of Example 1 was followed except that the amount of starting pentamethine oxonol dye (III) was halved. The crude produce was purified by flash column chromatography using 5% methanol in dichloromethane to give 1.3 g of the dye (29). Infrared and $^1H$ NMR spectra were consistent with the proposed structure. The dye had $\lambda_{max}$ at 411 nm ($\epsilon_{max}$ 12.33×10$^4$), 430 nm ($\epsilon_{max}$ 10.17×10$^4$), and 596 nm ($\epsilon_{max}$ 13.22×10$^4$) and fluoresced at 626 nm. Elemental analysis: Calcd for $C_{69}H_{71}Cl_4N_{10}O_{14}S_6Na.H_2O$: C, 50.55; H, 4.45; N, 8.54; Cl, 8.65; S, 11.73. Found: C, 50.36; H, 4.48; N, 8.33; Cl, 8.61; S, 12.02.

Coatings were prepared that contained the sensitizing dyes of the invention together with either a cubic or an octahedral silver halide emulsion. The cubic emulsion was AgBrI (97.4% Br, 2.6% I) with an equivalent spherical diameter of 0.20 μm; it was chemically sensitized with NaSCN (44 mg/Ag mole), $Na_2S_2O_3.5H_2O$ (33 mg/Ag mole), and $KAuCl_4$ (6.6 mg/Ag mole). The octahedral emulsion was AgBrI (97.0% Br, 3.0% I) with an equivalent spherical diameter of 0.30 μm; it was chemically sensitized with NaSCN (150 mg/Ag mole), $Na_2S_2O_3.5H_2O$ (8 mg/Ag mole), and $KAuCl_4$ (5 mg/Ag mole).

Sensitizing dyes were added either as methanol solutions, or as 2% phenoxyethanol in methanol solutions, to the emulsions melted at 40° C. In the cases where two dyes were added to an emulsion, the dyes were premixed and added as a single solution. After the dye solutions had been added, the emulsions were held for 20 minutes prior to chill setting.

The cubic emulsion melts were coated at 10.8 mg dm$^2$ (100 mg ft$^2$) Ag and 77 mg/dm$^2$ (717 mg/ft$^2$) gelatin and hardened with 0.08% bis(vinylsulfonyl)methyl ether. The octahedral emulsion melts were coated at 21.5 mg/dm$^2$ (200 mg/ft$^2$)Ag and 86 mg/dm$^2$ (800 mg/ft$^2$) gelatin and hardened with 0.08% bis(vinylsulfonyl)methyl ether.

EXAMPLE 3

Sensitizing effect of dyes of invention compared with that of cyanine and oxonol dyes A series of coatings was prepared of the cubic and octahedral AgBrI emulsions together with the following dyes:

(a) dye (1) of the invention;
(b) dye (29) of the invention;
(c) oxonol dye (III), an intermediate used to prepare dyes (1) and (29) of the invention;
(d) cyanine dye (V), a structural analog of the cyanine component of dyes (1) and (29) of the invention;
(e) an equimolar mixture of dyes (III) and (V).

Each of the dyes was added to the cubic emulsion at a concentration of 0.0006 mole per mole of Ag and to the octahedral emulsion at a concentration of 0.0004 mole per mole of Ag. The coatings were exposed in a single grating transmission spectral sensitometer, exposure times of 1.0 and 0.5 second, respectively, being used for the cubic and octahedral emulsion coatings. All of the coatings were processed at 35° C. in an Eastman Kodak RP X-OMAT machine. Photographic speed at several wavelengths, expressed in relative log spectral sensitivity units, was measured by a densitometer at 30 units above Dmin for each of the coatings. The results are given in Table I.

TABLE I

| Dye | Emulsion Type | Dmin | Speed (relative log spectral sensitivity units) | | | |
|---|---|---|---|---|---|---|
| | | | 400 nm | 470 nm | 610 nm | 640 nm |
| (1) | Cubic | 0.10 | 237 | 0 | 126 | |
| (29) | Cubic | 0.07 | 228 | 0 | 0 | 171 |
| (III) | Cubic | 0.10 | 250 | 0 | 0 | |
| (V) | Cubic | 0.09 | 227 | 251 | 0 | |
| (III) + (V) | Cubic | 0.10 | 238 | 245 | 0 | |
| (1) | Octahedral | 0.08 | 254 | 0 | 0 | |
| (29) | Octahedral | 0.07 | 239 | 0 | 0 | 0 |
| (III) | Octahedral | 0.06 | 246 | 0 | 0 | |
| (V) | Octahedral | 0.06 | 238 | 254 | 0 | |
| (III) + (V) | Octahedral | 0.06 | 239 | 245 | 0 | |

As can be seen from Table I the dyes of the invention imparted substantial red sensitivity at 610 and 640 nm to the coatings containing cubic ArBrI. The cyanine dye (V), either alone or in combination with (III), produced blue spectral sensitivity as measured at 470 nm, but neither dye acted as a red sensitizer, either singly or in equimolar mixture. Although dyes (1) and (29) contain the same cyanine chromophore as is present in (V), they showed no sensitizing effect at 470 nm.

In contrast to the results with the cubic emulsion coatings, dyes (1) and (29) imparted no detectable red spectral sensitivity to the octahedral emulsion coatings, thus demonstrating the remarkable dependency of sensitization by compounds of the invention on the morphology of the silver halide grain.

EXAMPLE 4

Sensitizing effect of dyes of invention at various coating levels

The cubic emulsion was coated with dyes (1) and (29) of the invention at levels of 0.0002, 0.0006, and 0.0008 mole per mole of Ag. The octahedral emulsion was coated with the same dyes at levels of 0.0001, 0.0002, and 0.0004 mole per mole of Ag. Exposure, processing, and speed measurements of the coatings were carried out as described in Example 3. The results are compiled in Table II.

TABLE II

| Dye | Emulsion Type | mole dye/ mole Ag | Dmin | Speed (relative log spectral sensitivity units) | | |
|---|---|---|---|---|---|---|
| | | | | 400 nm | 610 nm | 640 nm |
| None | Cubic | — | 0.11 | 219 | — | — |
| (1) | Cubic | 0.0002 | 0.11 | 247 | 173 | |
| (1) | Cubic | 0.0006 | 0.11 | 237 | 138 | |
| (1) | Cubic | 0.0008 | 0.10 | 236 | 119 | |
| None | Cubic | — | 0.09 | 231 | — | — |
| (29) | Cubic | 0.0002 | 0.09 | 248 | | 194 |
| (29) | Cubic | 0.0006 | 0.09 | 211 | | 137 |
| (29) | Cubic | 0.0008 | 0.09 | 205 | | 120 |
| None | Octahedral | — | 0.10 | 255 | — | — |
| (1) | Octahedral | 0.0001 | 0.08 | 253 | 0 | 0 |
| (1) | Octahedral | 0.0002 | 0.08 | 284 | 0 | 0 |
| (1) | Octahedral | 0.0004 | 0.09 | 265 | 0 | 0 |
| None | Octahedral | — | 0.10 | 255 | — | — |
| (29) | Octahedral | 0.0001 | 0.08 | 248 | 0 | 0 |
| (29) | Octahedral | 0.0002 | 0.08 | 248 | 0 | 0 |
| (29) | Octahedral | 0.0004 | 0.09 | 256 | 0 | 0 |

The results in Table II for the coatings of cubic emulsions show the decreasing red speed as the level of the dyes of the invention was increased. It is thus advantageous to use these dyes in low concentrations. As observed previously, the dyes (1) and (29) imparted no red sensitization to the coatings of octahedral AgBrI at any of the three levels tested.

The invention has been described in detail with particular reference to preferred embodiments thereof, but it will be understood that variations and modifications can be effected within the spirit and scope of the invention.

We claim:

1. A photographic element comprising a support having thereon a silver halide emulsion layer comprising cubic silver halide crystals and a dye of the general formula (I) or (II)

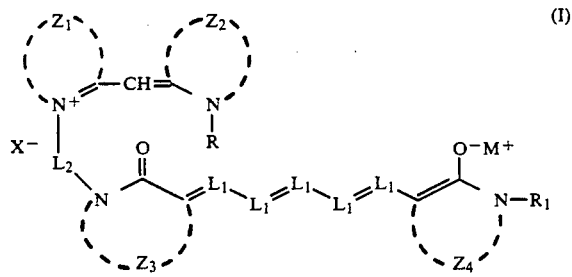

(I)

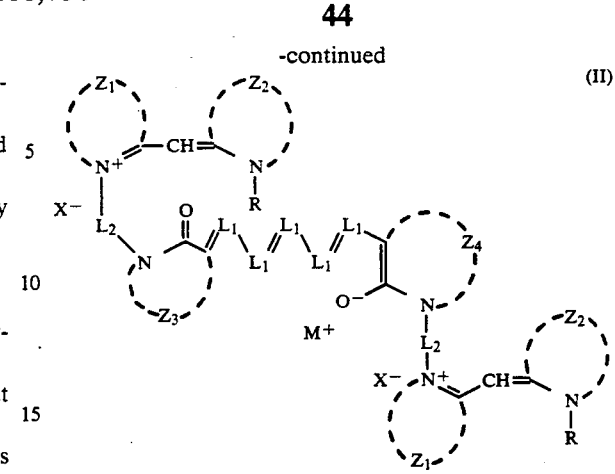

(II)

wherein $Z_1$, $Z_2$, $Z_3$ and $Z_4$ each independently represent the non-metallic atoms necessary to complete a substituted or unsubstituted heterocyclic ring system containing at least one 5- or 6- membered heterocyclic nucleus; R and $R_1$ each represent a substituted or unsubstituted alkyl group of 1 to 10 carbon atoms, or a substituted or unsubstituted aryl, aralkyl, or cycloalkyl group of 5 to 12 carbon atoms; $L_1$ independently represents an unsubstituted or alkylsubstituted methine group; $L_2$ represents a linking group of 4 to 20 atoms containing at least two alkylene groups and at least one ester group, amide group, or carbamate group; $M^+$ represents a cation; and $X^-$ represents an anion or an anionic group bonded to the compound.

2. A photographic element according to claim 1 wherein $Z_3$ and $Z_4$ each independently represent the atoms necessary to complete a barbituric acid nucleus.

3. A photographic element according to claim 1, wherein $Z_3$ and $Z_4$ each independently represent the atoms necessary to complete a 5-pyrazolone nucleus.

4. A photographic element according to claim 1, wherein $Z_1$ and $Z_2$ each independently represent the atoms necessary to complete a benzothiazole nucleus.

5. A photographic element according to claim 1, wherein the groups $L_1$ are each CH.

6. A photographic element according to claim 1 wherein the group R is a sulfoalkyl group of 1 to 8 carbon atoms.

7. A photographic element according to claim 1 wherein the group $R_1$ is a carboxyalkyl group of 2 to 8 carbon atoms.

* * * * *